US006762011B2

United States Patent
Renaldo et al.

(10) Patent No.: US 6,762,011 B2
(45) Date of Patent: Jul. 13, 2004

(54) DEPOSITION OF A PROJECTION STRUCTURE ON A SUBSTRATE USING A NEGATIVE MASK AND NEGATIVE PHOTORESIST

(75) Inventors: Alfred F. Renaldo, San Jose, CA (US); Douglas J. Werner, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 10/123,617

(22) Filed: Apr. 15, 2002

(65) Prior Publication Data

US 2003/0194657 A1 Oct. 16, 2003

(51) Int. Cl.⁷ .................................................. G03F 7/26
(52) U.S. Cl. ....................... 430/315; 430/319; 430/396
(58) Field of Search ................................ 430/311, 315, 430/319, 396

(56) References Cited

U.S. PATENT DOCUMENTS

| 4,970,615 A | 11/1990 | Gau | 360/122 |
| 5,116,719 A | 5/1992 | Gau | 430/313 |
| 5,512,394 A | * 4/1996 | Levenson et al. | 430/5 |
| 5,793,578 A | 8/1998 | Heim et al. | 360/126 |
| 5,798,897 A | 8/1998 | Chang et al. | 360/126 |
| 5,805,391 A | 9/1998 | Chang et al. | 360/113 |
| 5,901,432 A | * 5/1999 | Armstrong et al. | 29/603.14 |
| 6,111,724 A | 8/2000 | Santini | 360/126 |

FOREIGN PATENT DOCUMENTS

| JP | 1171109 | 7/1989 |
| JP | 3147506 | 6/1991 |
| JP | 6020227 | 1/1998 |
| JP | 11007613 | 1/1999 |

OTHER PUBLICATIONS

"Thin Film Head Assembly With Side By Side Elements," IBM Technical Disclosure Bulletin vol. 24, Pub. No. 81A 06516, pp. 910–911 (Sep. 1981).

* cited by examiner

Primary Examiner—Kathleen Duda
(74) Attorney, Agent, or Firm—Gregory Garmong; William D. Gill

(57) ABSTRACT

A projection structure is deposited on a substrate having a top surface by applying a negative photoresist overlying the substrate, and positioning a mask overlying the substrate and lying in a mask plane generally parallel to the top surface. The mask is a negative mask that is opaque in a region defining a location where the projection structure is to be deposited. The method further includes exposing the negative photoresist through the mask, baking and developing the exposed negative photoresist, and depositing the projection structure through the exposed and etched negative photoresist.

18 Claims, 6 Drawing Sheets

DEPOSITION OF A PROJECTION STRUCTURE ON A SUBSTRATE USING A NEGATIVE MASK AND NEGATIVE PHOTORESIST

This invention relates to the fabrication of a small-scale structure and, more particularly, to the fabrication of a narrow pole tip in the write portion of a magnetic read/write head.

BACKGROUND OF THE INVENTION

A read/write head of a computer hard disk or a magnetic recording tape is positioned closely adjacent to a recording medium, separated from the recording medium by an air bearing that does not allow them to touch or that permits only light touching. A data bit is written onto an area of the recording medium, typically a track moved past the read/write head, using the writing portion of the read/write head by locally changing the magnetic state of the recording medium. That magnetic state is later sensed by the read sensor to read the data. The write structure and the read structure are usually integrated together in the read/write head.

In the most popular design, the write structure includes a small-scale horseshoe-like electromagnet with the poles oriented perpendicular to the air bearing surface (ABS) that faces the air bearing. Because of the small size, the electromagnet, including the legs of the horseshoe, the pole layers, the magnetization coil, and the related structure, are fabricated by microelectronic techniques as a multilayered structure.

A continuing trend in the industry is to make the tracks in the recording medium ever narrower and more closely spaced, so that more information may be stored on the recording medium. In order to write onto a narrow track on the recording medium, the pole tip of one of the poles of the write head is made very narrow and has reached submicron widths in current writing devices. The fabrication of such a write pole tip presents some difficult challenges because of the geometries. The pole is deposited overlying the write structure. The pole tip is narrower than the pole, so that there is a flaring of the width of the pole material from the pole tip toward the pole. In some designs the flare is made quite pronounced and the location of the flare is close to the air bearing surface.

When the pole tip and pole are fabricated by conventional microelectronic techniques, the profile of the pole tip may be ragged near the location of the flare, a condition termed "notching". Techniques such as the application of coatings to the underlying substrate are used to reduce the incidence of notching, but such techniques add more fabrication steps and are not fully satisfactory in the results achieved.

There is a need for an approach to minimize or avoid the notching of the pole tip in the writing portion of the read/write head. The present invention fulfills this need, and further provides related advantages.

SUMMARY OF THE INVENTION

The present invention provides a method for fabricating a projection structure such as a pole tip and pole of a magnetic read/write head, and a structure produced by the method. The projection structure does not suffer from the notching effect found in projection structures made by other techniques. Additional deposited layers, tooling, and process steps are not required, as compared with conventional fabrication procedures. The present approach is compatible with the use of alternating phase-shifted masks, an important advantage that permits improved resolution and a reduction in the width of the pole tip.

In accordance with the invention, a method for depositing a projection structure comprises the steps of furnishing a substrate having a top surface, thereafter applying a negative photoresist overlying the substrate, and positioning a mask overlying the substrate and lying in a mask plane generally parallel to the top surface. The mask is a "negative" mask which is opaque in a region defining a location where the projection structure is to be deposited. The method further includes thereafter exposing the negative photoresist through the mask to produce an exposed negative photoresist, thereafter baking and developing the exposed negative photoresist to produce an exposed-and-etched negative photoresist, and thereafter depositing the projection structure through the exposed and etched negative photoresist.

In a preferred application, the substrate is a portion of the magnetic read-write head, built up through the complete read head and the first pole piece and coil windings of the write head. The deposited projection structure comprises a flared portion and a projection extending from the flared portion, deposited upon the substrate. This projection structure includes a pole tip of the write portion of the magnetic read/write head. In this application, the deposited structure is a ferromagnetic material such as an alloy of nickel and iron.

An important embodiment includes the use of a phase-shifted mask, and preferably an alternating phase-shifted mask. The phase-shifted mask may not be used with a positive photoresist to produce the feature geometry required for pole tip definition.

The origin of the notching effect that leads to a degraded structure of conventional pole tip structures has been traced to the effect of light that is reflected from topographical features on the top surface of the substrate during the exposure of the conventionally utilized positive photoresist through the positive mask. This reflected light exposes the positive photoresist in the areas adjacent to and outside of the desired pole-tip profile. Upon developing the positive photoresist, the profile of the sides of the positive photoresist that define the sides of the pole tip after metal deposition are not smooth and parallel, as is desired. Instead, the sides of the positive photoresist are irregular, particularly near the point where the pole tip flares outwardly to the full width of the pole. This irregularity is translated into the deposited pole tip, and is the cause of the undesirable notching effect. Efforts to suppress the reflected light from the top surface of the substrate require additional layers or steps.

In the present approach, by contrast, the result of using a negative mask and a negative photoresist, rather than a positive mask and a positive photoresist, is that any light reflected from topography on the top surface of the substrate is reflected into a volume of the photoresist that is exposed in any event through the transparent portions of the negative mask. The reflected light is thus present, but it does no harm and in fact aids in assuring that the negative photoresist is fully exposed. Accordingly, the notching phenomenon is avoided, and a more perfectly defined projection structure is produced.

The present invention thus provides a more precisely defined projection structure, such as the preferred pole tip and pole, as compared with a conventionally fabricated projection structure. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIGS. 8–9 are schematic views of light paths during the exposure process using a conventional positive mask and positive photoresist, wherein FIG. 8 is a plan view and FIG. 9 is a sectional view taken on line 9—9 of FIG. 8; and FIGS. 10–11 are schematic views of light paths during the exposure process using the negative mask and negative photoresist of the present invention, wherein FIG. 10 is a plan view and FIG. 11 is a sectional view taken on line 11—11 of FIG. 10.

DETAILED DESCRIPTION OF THE INVENTION

Figure 1:
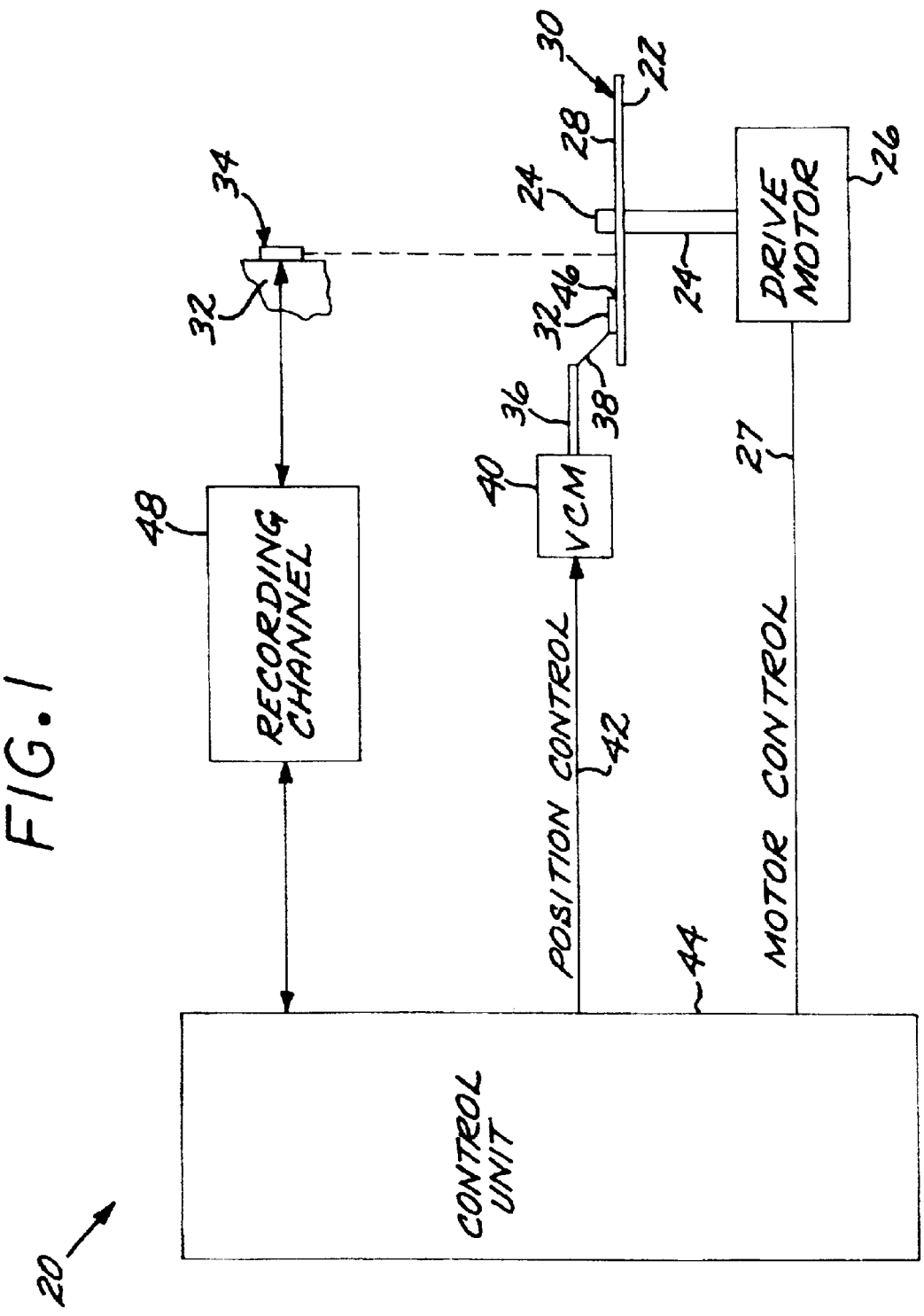
FIG. 1 is a schematic diagram of a magnetic disk data storage system.

FIG. 1 depicts a data storage system, here illustrated as a magnetic disk drive system 20, with which the present approach may be used. The magnetic disk drive system 20 includes a rotatable magnetic storage disk 22 that is supported on a spindle 24 and rotated by a disk drive motor 26 under motor control 27 of a control unit 44. A magnetic storage medium 28 is deposited on a surface 30 of the magnetic storage disk 22.

A slider 32 is positioned in facing relation to the magnetic storage disk 22. The slider 32 supports at least one read/write magnetic head 34 in facing relation to the magnetic storage medium 28 of the magnetic storage disk 22. The slider 32 is mounted to an actuator arm 36 by a suspension 38. The actuator arm 36 and the slider 32 move radially inwardly and outwardly so that the combined inward/outward motion of the slider 32 and the rotation of the magnetic storage disk 22 allows the read/write head 34 to be placed into facing relation to the entire area of the magnetic storage medium 28. The actuator arm 36 is driven by an actuator 40 (depicted as a voice coil motor or VCM) under the radial position control 42 of the control unit 44.

The suspension 38 generates a slight spring force which biases the slider 32 toward the surface 30 of the magnetic storage disk 22. During sensor operation the magnetic storage disk 22 turns, and an air bearing is created between the downwardly facing surface of the slider 32, termed the air bearing surface 46 or ABS, and the upwardly facing surface 30 of the magnetic storage disk 22. (Only the downwardly oriented slider is illustrated, but there may also or instead be an upwardly oriented slider facing the bottom side of the magnetic storage disk.) The air bearing counterbalances the slight spring force of the suspension 38 and supports the slider 32 a small distance above the surface 30 with a small, substantially constant separation.

The read/write head 34 writes data onto the magnetic storage medium 28 by altering magnetic states in the magnetic storage medium, and also reads data from the magnetic storage medium 28 by sensing the magnetic states in the magnetic storage medium 28. The writing and reading commands, as well as the data to be written or read, are transmitted between the control unit 44 and the read/write head 34 over a recording channel 48. The present approach is concerned with a magnetic write structure that is part of the read/write head 34.

The preceding discussion is a simplified description of the data storage system in the form of the magnetic disk drive system 20, to set the environment in which the present invention is used. The present invention is also applicable to other types of magnetic data storage systems such as tape drives and their read/write heads.

Figure 2:
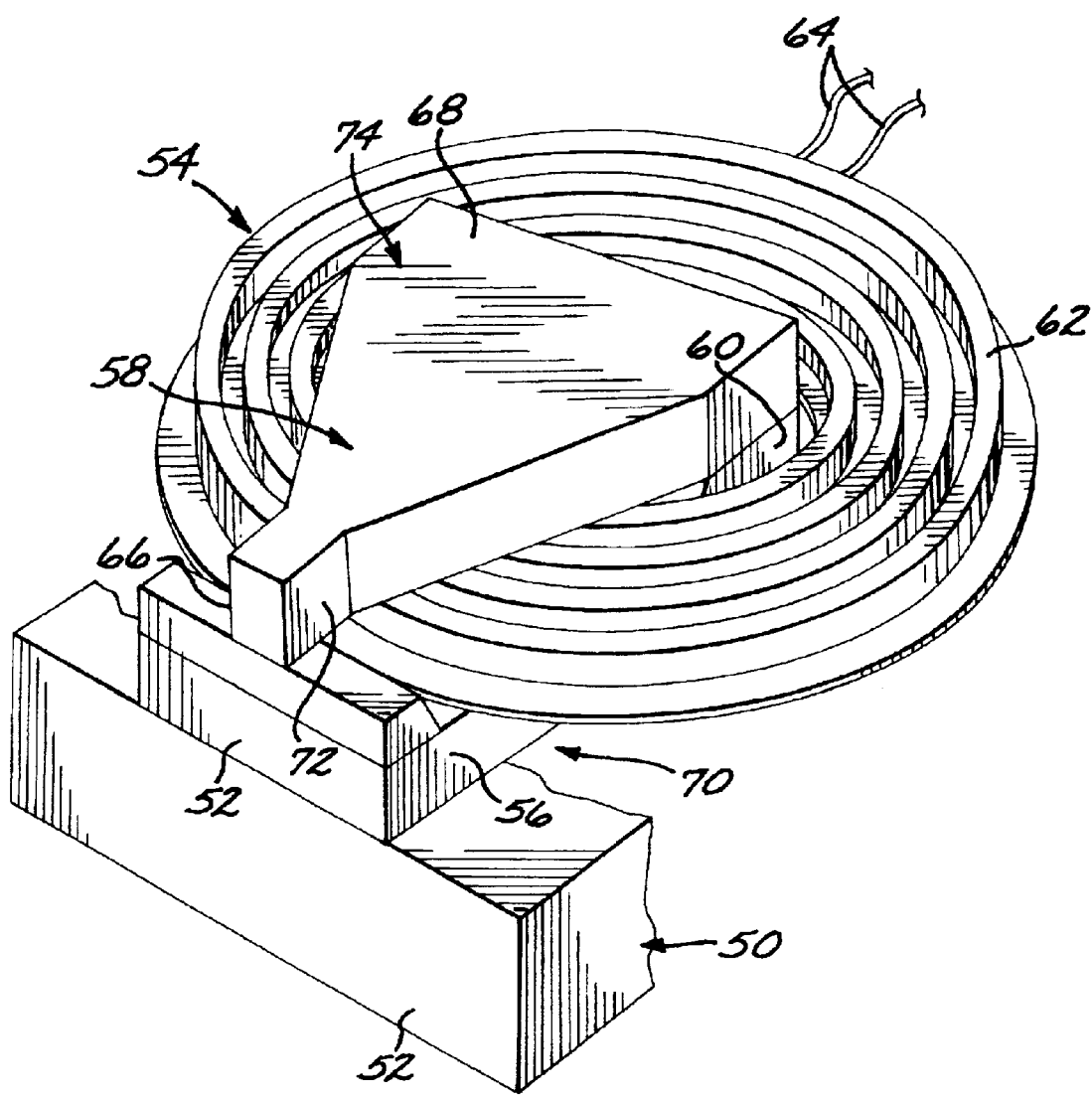
FIG. 2 is a schematic perspective depiction of the read/write head.

FIG. 2 schematically depicts the pertinent portions of the read/write head 34 in greater detail. Read/write heads are known in the art, except for the improvements set forth herein, and are described, for example, in U.S. Pat. Nos. 3,908,194 and 6,043,960, whose disclosures are incorporated by reference.

The read/write head 34 includes a read sensor 50, shown in block form without detail, adjacent to an air bearing surface 52. The preferred read sensors are magnetoresistance (MR) sensors. Two known types of MR sensors are a giant magnetoresistance (GMR) sensor and a tunnel magnetoresistance (TMR) sensor. The general technical basis, construction, and operation of the GMR sensor are described, for example, in U.S. Pat. No. 5,436,778. The general technical basis, construction, and operation of the TMR sensor are described, for example, in U.S. Pat. No. 5,729,410. The disclosures of both patents are incorporated by reference in their entireties. These patents also generally describe the read/write heads and the magnetic storage systems.

The read/write head 34 also includes a write structure 54 at the air bearing surface 52. During the manufacturing operation, the write structure 54 is deposited upon the read sensor 50. The write structure 54 includes a lower pole piece (P1) 56 and an upper pole piece (P2) 58. A back gap structure 60 joins the lower pole piece 56 and the upper pole piece 58 at a location remote from the air bearing surface 52, thereby defining a U-shaped pole-piece structure. A multi-turn inductive coil 62, driven through leads 64, passes through the space between the pole pieces 56 and 58. As illustrated, the upper pole piece 58 includes a narrow pole tip 66 and a piece 68 that is outwardly flared to the width of the back gap structure 60 and the lower pole piece 56.

The present approach is concerned with the fabrication of the upper pole piece 58, with its narrow pole tip 66 and its outwardly flared pole piece 68, which serves as a projection structure 74. In this configuration and fabrication processing, the structure below the upper pole piece 68, specifically the read sensor 50, the lower pole piece 58, and inductive coil 62 together serve as a substrate 70 upon which the upper pole piece 58 is fabricated. In FIG. 2, the pole tip 66 is illustrated as fabricated by the present approach with parallel, flat, regular sides 72. However, in prior approaches, the sides of the pole tip 66 have often been irregularly shaped, leading to a loss of functionality.

Figure 3:
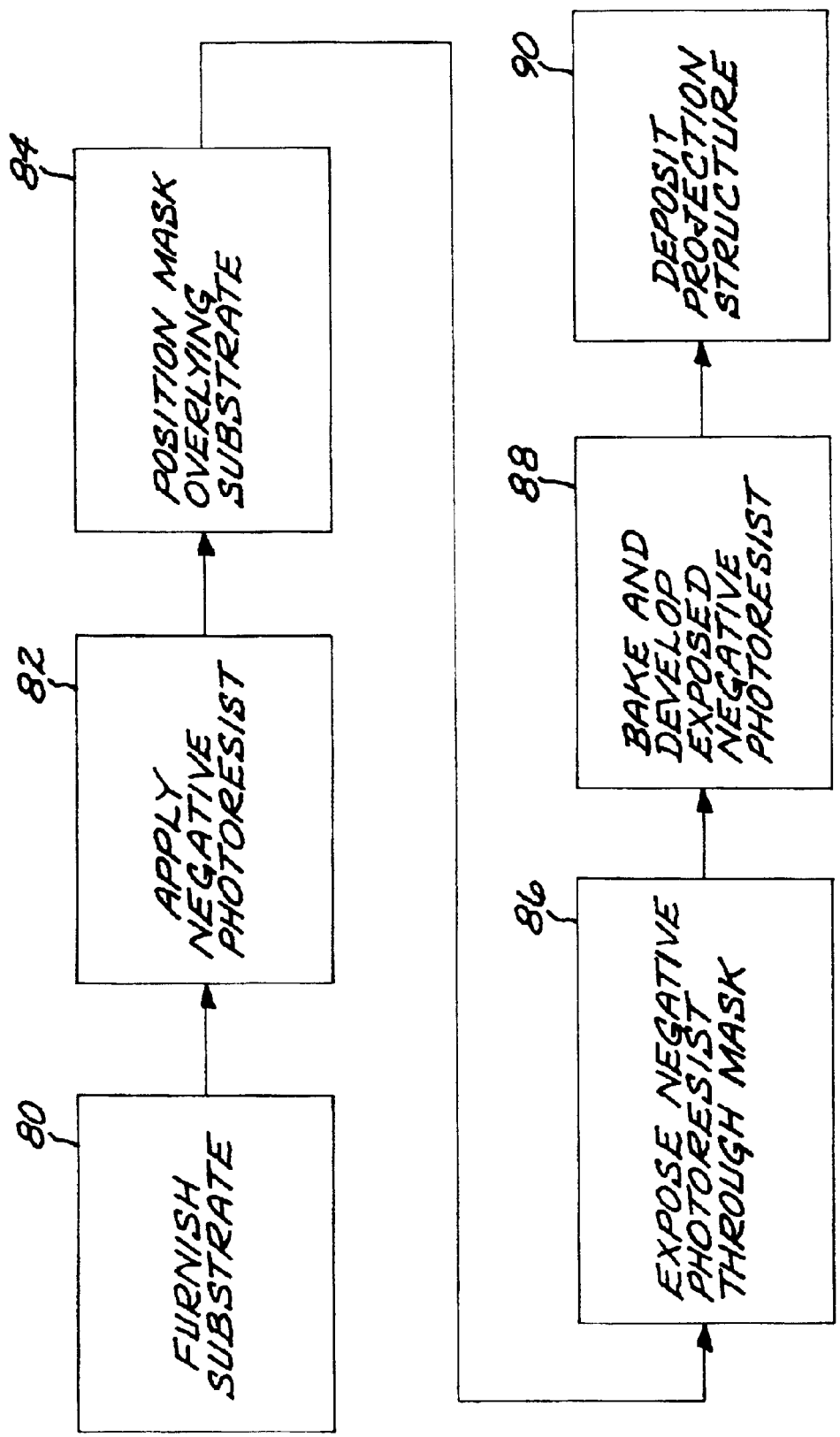
FIG. 3 is a block flow diagram of a preferred approach for depositing a projection structure.

FIG. 3 is a block diagram of a preferred approach for depositing the projection structure 74, and FIGS. 4–7 (which are not drawn to scale) illustrate the structure at various points in the fabrication processing. The substrate 70, fabricated by conventional techniques, is furnished, numeral 80. A layer 100 of a negative photoresist is applied overlying and contacting a surface 102 of the substrate 70, numeral 82 of FIG. 3. The layer 100 is preferably applied by spinning on a flowable negative photoresist material, and soft baking the layer to hold it in place as a solid, using the recommended procedure for the negative photoresist material. Negative photoresists are known in the art for other purposes. A preferred negative-acting photoresist is based upon a Novolak resin for I-line or upon a polyvinyl phenol resin for deep-UV irradiation. In both cases, a crosslinking agent is activated by a photogenerated acid upon baking after exposure. Negative photoresists are available commercially from most resist vendors such as Sumitomo, JSR, Shipley, or Tokyo Ohka.

Figure 4:
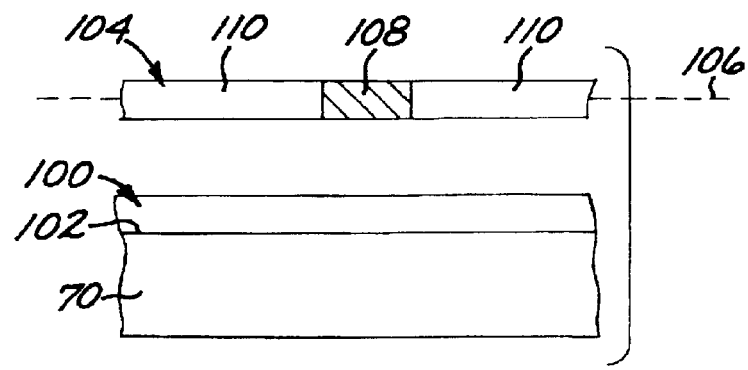
FIGS. 4–7 are schematic side sectional views of the structure at various points of the fabrication processing.

A mask 104 is thereafter positioned overlying (but typically separated from) the substrate 70, numeral 84 of FIG. 3, and see the structure of FIG. 4. The mask 104 is generally planar and lies in a mask plane 106 generally parallel to the surface 102. The mask 104 is a negative mask that is opaque in an opaque region 108 that defines a location where the projection structure 74 is later to be deposited and is transparent in a transparent region 110. The mask may be a conventional mask, or it may be a phase-shifted mask such as an alternating phase-shifted mask. Phase-shifted masks and their use are known in the art for other purposes. See, for example, U.S. Pat. Nos. 6,291,112 and 6,306,558, whose disclosures are incorporated by reference. The use of the phase-shifted mask allows improved resolution, thereby avoiding the need for using more complex and expensive tooling within the effective size range of the phase-shifted mask. The alternating phase-shifted mask may not be used to form the desired feature topology (i.e., an isolated opening in the resist layer 100) with the positive photoresist used in conventional photolithographic processes to fabricate projection structures, because the mask in that case consists of only a single opening. There is no second opening available to produce the shift in phase. In the present approach, the polarity of the mask is reversed, so that the openings on either side of the mask's opaque projection structure may be fashioned in opposite phases.

Figure 5:
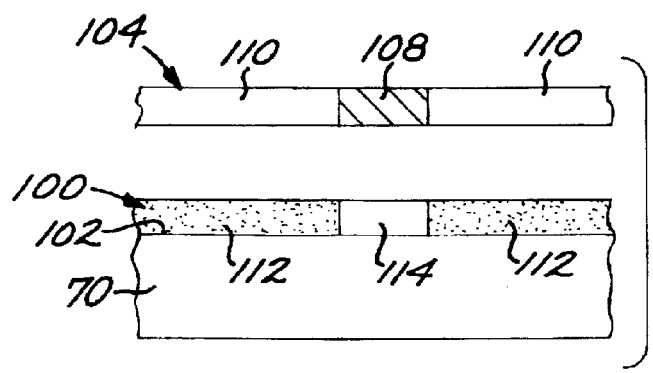

The negative photoresist is thereafter exposed through the mask to produce an exposed negative photoresist, numeral 86 of FIG. 3 and the structure of FIG. 5. The exposure intensity and times are as recommended for the negative photoresist material. The exposure 86 produces an exposed region 112 of the negative photoresist layer 100, and leaves an unexposed region 114 beneath the opaque region 108 of the mask 104.

After the exposure 86 is complete, the mask 104 is removed.

Figure 6:
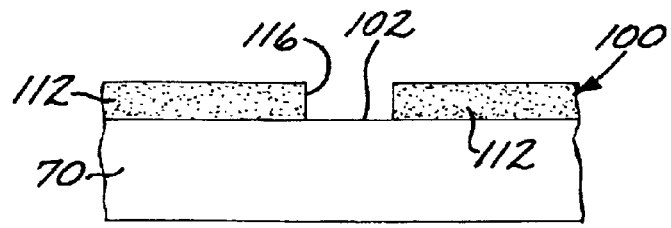

The layer 100 of the exposed negative photoresist is thereafter baked and developed using conditions recommended for the photoresist material. The baking crosslinks the photoresist polymer in the exposed areas to render it insoluble in the subsequent development step, numeral 88 of FIG. 3, and as seen in FIG. 6. Thus, the developing procedure removes the photoresist in the unexposed region 114, leaving a cavity 116 that extends to and exposes the surface 102 of the substrate 70.

Figure 7:
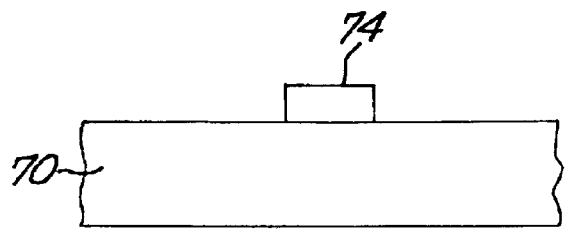

The projection structure is thereafter deposited through the exposed and etched negative photoresist, numeral 90 of FIG. 3, to produce the projection structure 74 as shown in FIG. 7. The deposition is accomplished by any operable approach, with electrodeposition preferred. For the preferred application of the read/write magnetic head 34, the projection structure 74 is preferably made of a ferromagnetic material such as an alloy of nickel and iron. An alloy of 45 atomic percent nickel and 55 atomic percent nickel is preferred. Techniques for electrodepositing such alloys are known in the art for other purposes.

Figure 8:
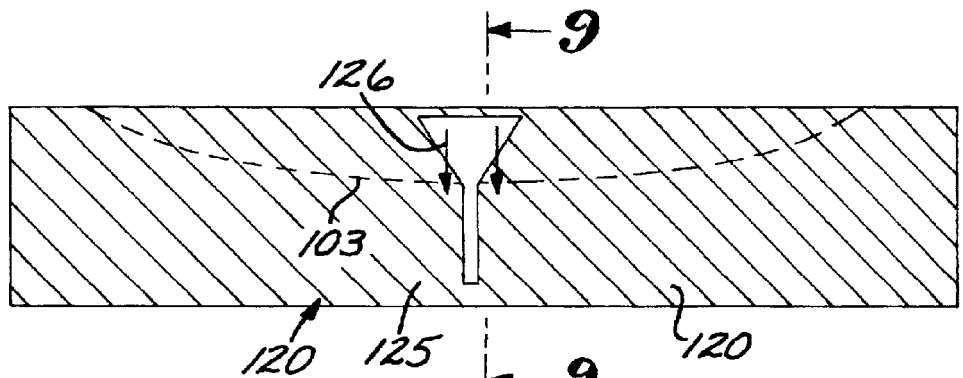
Figure 9:
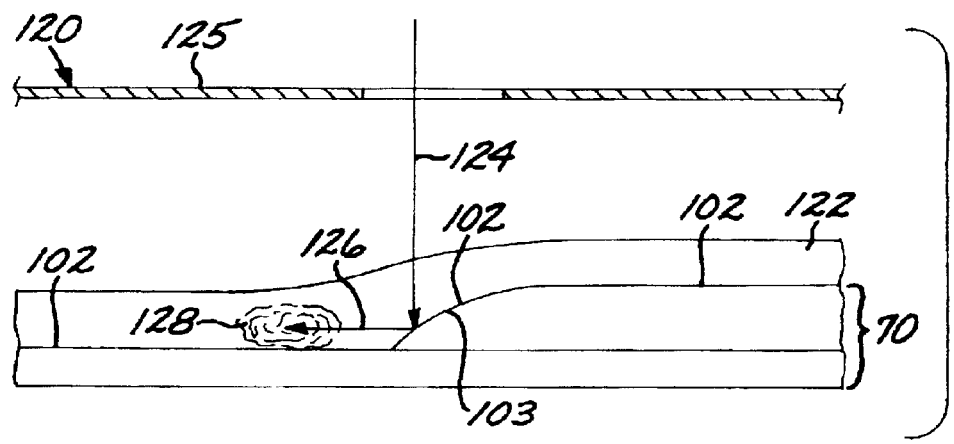

FIGS. 8–11 illustrate the advantages of using the present combination of a negative mask and negative photoresist, as compared with the alternative approach of using a positive mask and positive photoresist. In these figures, which are not drawn to scale, elements described previously are assigned the same callout numerals, and the prior description is incorporated. As seen in FIGS. 8–9, when a positive mask 120 is used to expose a layer 122 of positive photoresist that overlies the substrate 70, some of the exposure light beam 124 reflects from a convexly curved (relative to the substrate 70) lateral surface 103 that is a portion of the surface 102 and into the portion of the layer 122 that lies below the opaque portion 125 of the mask and is not to be exposed, as a reflected light beam 126. This reflected light beam 126 exposes some of the positive photoresist in a sidelobe volume 128, which then is removed during the subsequent development. As seen in FIG. 9, the lateral surface 103 is the portion of the surface 102 that is oriented at an angle to the remainder of the top surface 102 of more than zero but less than 90 degrees, and thus provides a reflecting surface that reflects the reflected light beam 126 into the sidelobe volume 128. The result is that the cavity into which the deposition occurs has an irregular side wall, i.e., the reflective notching phenomenon that may adversely affect the functioning of the write head.

Figure 10:
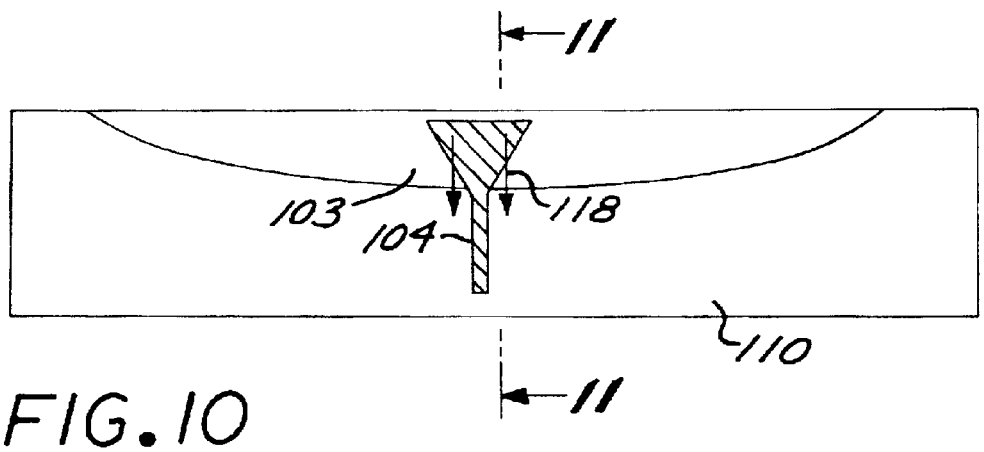
Figure 11:
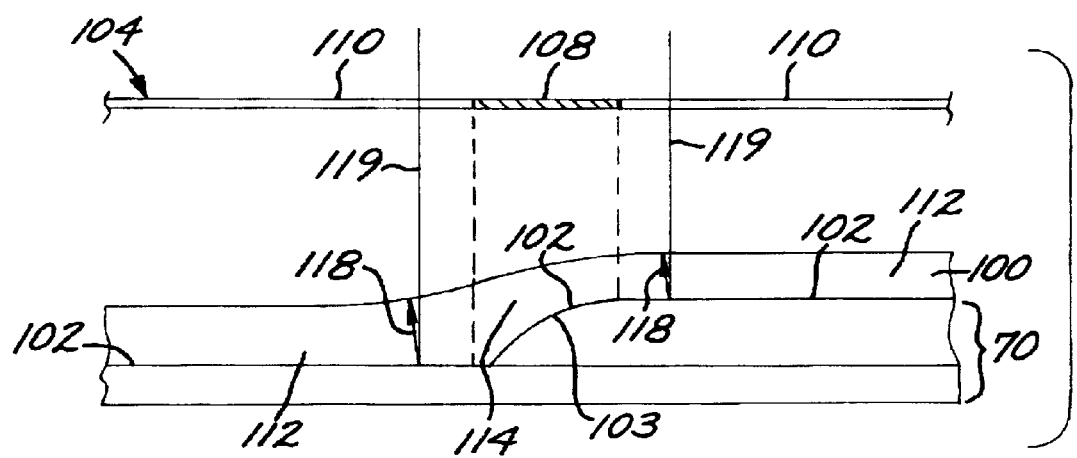

By comparison, FIGS. 10–11 illustrate the results during the photoexposure process when the negative mask 104 and negative photoresist layer 100 are used in the present approach. Due to the use of the negative mask 104 and the geometry of the surface 102, a reflected light beam 118, resulting from the reflection of the exposure light beam 119 from the convexly curved (relative to the substrate 70) lateral surface 103, reflects at a near-perpendicular angle and into the portion of the negative photoresist 100 that is to be exposed and subsequently retained in any event. The reflected light beam 118 not only does not produce an adverse effect, but it actually aids in ensuring full exposure and retention of the exposed region 112 of the layer 100 of negative photoresist. The opaque region 108 of the negative mask 104 overlies at least a portion of (and preferably all of) the lateral surface 103, so that the exposure light beam 119 does not ever reach and reflect from the lateral surface 103 to produce a reflected light beam comparable to the reflected light beam 126 of FIG. 9.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for depositing a projection structure, comprising the steps of
   furnishing a substrate having a top surface; thereafter
   applying a negative photoresist overlying the substrate;
   positioning a mask overlying the substrate, the mask being opaque in a region defining a location where the projection structure is to be deposited; thereafter
   exposing the negative photoresist through the mask to produce an exposed negative photoresist; thereafter
   baking and developing the exposed negative photoresist to produce an exposed-and-etched negative photoresist; and thereafter
   depositing the projection structure through the exposed and etched negative photoresist.

2. The method of claim 1, wherein the step of furnishing the substrate includes the step of furnishing the substrate comprising a read portion of a magnetic read/write head.

3. The method of claim 1, wherein the step of positioning includes the step of providing a phase-shifted mask.

4. The method of claim 1, wherein the step of positioning includes the step of providing an alternating phase-shifted mask.

5. The method of claim 1, wherein the step of depositing includes the step of depositing the projection structure comprising a flared portion and a projection extending from the flared portion.

6. The method of claim 1, wherein the step of depositing includes the step of depositing the projection structure comprising a pole tip of a write portion of a magnetic read/write head.

7. The method of claim 1, wherein the step of depositing includes the step of depositing the projection structure comprising a pole tip and a flared pole piece of a write portion of a magnetic read/write head.

8. The method of claim 1, wherein the step of depositing includes the step of depositing a ferromagnetic material.

9. The method of claim 1, wherein the step of depositing includes the step of depositing an alloy of nickel and iron.

10. A method for depositing a projection structure comprising a write portion of a magnetic read/write head, the method comprising the steps of furnishing a substrate comprising a read portion of the magnetic read/write head and having a top surface susceptible to reflecting light therefrom; thereafter applying a negative photoresist overlying the substrate;

positioning a negative mask overlying the substrate and lying in a mask plane generally parallel to the top surface, the mask being opaque in a region defining a location where the projection structure is to be deposited; thereafter exposing the negative photoresist through the mask to produce an exposed negative photoresist; thereafter baking and developing the exposed negative photoresist to produce an exposed-and-etched negative photoresist; and thereafter depositing the projection structure through the exposed and etched negative photoresist, the projection structure comprising a flared pole portion and a pole-tip projection extending from the flared portion.

11. The method of claim 10, wherein the step of positioning includes the step of providing a phase-shifted mask.

12. The method of claim 10, wherein the step of positioning includes the step of providing an alternating phase-shifted mask.

13. The method of claim 10, wherein the step of depositing includes the step of depositing a ferromagnetic material.

14. The method of claim 10, wherein the step of depositing includes the step of depositing an alloy of nickel and iron.

15. A method for depositing a projection structure overlying and extending outwardly relative to a lateral surface of a substrate, comprising the steps of furnishing a substrate having a top surface and the lateral surface portion thereof oriented at an angle to a remainder of the top surface;

applying a negative photoresist overlying the substrate;

positioning a mask overlying the substrate and parallel to the top surface, the mask being opaque in a region defining a location where the projection structure is to be deposited and overlying at least a portion of the lateral surface;

patterning the negative photoresist through the mask;

baking and developing the patterned negative photoresist; and depositing the projection structure on the top surface of the substrate through the patterned and etched negative photoresist.

16. The method of claim 15, wherein the step of depositing the projection structure includes the step of depositing the projection structure comprising a pole tip of a write portion of a magnetic read/write head.

17. The method of claim 15, wherein the step of depositing the projection structure includes the step of depositing the projection structure comprising a pole tip and a flared pole piece of a write portion of a magnetic read/write head.

18. The method of claim 15, wherein the step of furnishing the substrate includes the step of furnishing the substrate wherein the lateral surface is convexly curved relative to the substrate.

* * * * *